United States Patent [19]
Allen

[11] Patent Number: 6,151,556
[45] Date of Patent: Nov. 21, 2000

[54] METHOD AND APPARATUS FOR DOPPLER SMEAR CORRECTION IN MARINE SEISMOLOGY MEASUREMENTS

[75] Inventor: Kenneth Paul Allen, Dallas, Tex.

[73] Assignee: Mobil Oil Corporation, Fairfax, Va.

[21] Appl. No.: 09/336,658

[22] Filed: Jun. 18, 1999

[51] Int. Cl.[7] .................................................. G01V 1/28
[52] U.S. Cl. .............................................. 702/18; 367/23
[58] Field of Search ................................ 702/14, 16, 17, 702/18; 367/21–24

[56] References Cited

U.S. PATENT DOCUMENTS

| | | | |
|---|---|---|---|
| 4,159,463 | 6/1979 | Silverman | 340/15.5 |
| 4,380,059 | 4/1983 | Ruehle | 367/46 |
| 4,809,235 | 2/1989 | Dragoset, Jr. | 367/21 |
| 5,134,590 | 7/1992 | Garotta | 367/38 |
| 5,325,436 | 6/1994 | Soli et al. | 381/68 |

OTHER PUBLICATIONS

*Exploration Seismology*, R. E. Sheriff and L. P. Geldart, 1995, 11 pages, Australia.
Simple Theory For Correction Of Marine Vibroseis Phase Dispersion, P.S. Schultz et al., pp. 660–662, U.S.A.
Marine Vibrators And The Doppler Effect, W. H. Dragoset, pp. 1388–1398, Nov. 1988, Houston, Texas.
The Effects Of Source And Receiver Motion On Seismic Data, G. Hampson et al., Geophysical Prospecting, vol. 43, 1995, pp. 221–224.

*Primary Examiner*—Donald E. McElheny, Jr.

[57] ABSTRACT

A seismic system is provided with a method of reducing distortions caused by motion of a source and receiver in marine seismic measurements. In one embodiment, the seismic system comprises a seismic source, a seismic receiver, a source/receiver interface unit, a processing unit, a data storage unit, a display device, and a user input device. The processing unit is configured to receive seismic measurements from the seismic receiver and to create a seismic velocity model from the received data. The processing unit uses the velocity model to calculate a dilation function that is indicative of distortion caused by motion of the seismic source. Preferably, the processing unit corrects the seismic measurements for this distortion by computing a transform of the seismic measurements, partitioning the transformed measurements into "dip slices", inverse transforming the individual dip slices, correcting the dip slice measurements according to the dilation function, and adding the corrected dip slice measurements together to obtain the corrected seismic measurements. The disclosed system and method can advantageously provide for more accurate correction for source motion, which in turn yields seismic data having substantially reduced "smear" when ensemble averaging is performed to reduce seismic noise.

18 Claims, 20 Drawing Sheets

```
REM:  DIFFRACTOR MODEL FOR DOPPLER IN V(Z)

REM: CONFIDENTIAL AND PROPRIETARY INFORMATION OF MOBIL OIL CORPORATION

DIM zi(100), vi(100), p(100), delay(100), dz(100), vz(100)
DIM keepp(100), keepz(100), keept(100), rayend(100)
CLS disk$ = "nyes": REM: "yes" to output models to disk files (could be in memory)
pause$ = "yes": REM: "yes" to pause after each XD loop
dev$ = "b": REM: b for b drive, a for a drive   etc.
nlayer = 8: REM: nlayer = number of velocity layers

REM:  READ THE VELOCITY MODEL ( ASSUMED TO BE AVAILABLE )

FOR i = 1 TO nlayer
READ zi(i), vi(i)
PRINT zi(i), vi(i)
NEXT i

REM:  WRITE THE VELOCITY FILE TO OUTPUT
IF disk$ = "yes" THEN
   n$ = dev$ + ":vel.dat": REM: NAME OF VELOCITY MODEL
   OPEN n$ FOR OUTPUT AS #1
   PRINT #1, nlayer
   FOR i = 1 TO nlayer
   PRINT #1, zi(i), vi(i)
   NEXT i
   CLOSE
END IF

CLS

REM: SET UP MODEL PARAMETERS
tolx = 5: REM: TOLERANCE FOR RAY TRACING ITERATION ERROR in METERS
stepz = 20: REM: VELOCITY MODEL RESOLUTION (meters)
xstart = 2000: REM: STARTING XD (meters)  NORMALLY 0
xtotalmax = 2001: REM :  MAXIMUM WIDTH OF MODEL (meters) SUGGEST 2 x MAX OFFSET
stepdx = 2000: REM: SPATIAL SAMPLING OF MODEL (meters) NORMALLY RCVR SPACING REM:  START OF XD MODEL LOOP
REM : NOTE:  xtotal=  distance to diffractor (meters )   = XD FOR xtotal = xstart TO xtotalmax STEP stepdx kntp = 0: REM: counter for depth levels REM: START OF DIFFRACTOR DEPTH LOOP
REM: NOTE:  ztarget=diffractor depth (meters) =  ZD
REM: SET UP PARAMETERS Z0 = 200: REM: starting depth for model  (meters)
    ZLAST = 4200: REM: ending depth for model (meters)
    ddepth = 400: REM: DEPTH STEP FOR DIFFRACTOR MODEL DEPTHS (meters)

FOR ztarget = Z0 TO ZLAST STEP ddepth
```

FIG. 14A

```
kntp = kntp + 1

REM:  FIND OUT WHAT LAYER THE DIFFRACTOR IS IN

FOR z = 0 TO ztarget STEP stepz
v = vi(1): layer = 1
FOR j = 1 TO nlayer
   IF z > zi(j) THEN
   v = vi(j + 1): layer = j + 1
   END IF
NEXT j
NEXT z
PRINT ztarget; layer
REM:INPUT "vel"; q$

99 REM

REM: DEFINE MODEL GEOMETRY AND VELOCITY LAYERS & FIND V MAXIMUM IN THE PATH

FOR i = 1 TO layer - 1
dz(i) = zi(i) - zi(i - 1): vz(i) = vi(i)
NEXT i
dz(layer) = ztarget - zi(layer - 1): vz(layer) = vi(layer)
vmax = vz(1)
FOR j = 1 TO layer
IF vz(j) > vmax THEN vmax = vz(j)
PRINT j, dz(j); vz(j)
NEXT j

REM: BEGIN ITERATION TO FIND THE RAY PATH pmax = 1 / (vmax): REM horizontal in one of the beds

REM:  FIRST GUESS FOR RAY PARAMETER pguess = SIN(ATN(xtotal / ztarget)) / vz(1)

REM: CHECK FOR "ODD" CASES

IF pguess = 0 THEN pguess = .0001 / vz(1): REM: HANDLE 0 OFFSET CASE
IF pguess > pmax THEN pguess = .5 * pmax: REM: AVOID CRITICAL REFRACTION
PRINT pguess

88 REM : RETURN POINT IF ERROR TOO BIG

REM: PROPOGATE RAY FROM SURFACE TO TARGET DEPTH USING PGUESS sumx = 0: sumxg = 0

FOR i = 1 TO layer
REM:  CALCULATE THE PATH
f = pguess * vz(i)
g = (1 - f * f) ^ .5
sumx = sumx + dz(i) * f / g
REM: CALCULATE THE P GRADIENT OF THE PATH
f = .99999 * pguess * vz(i)
g = (1 - f * f) ^ .5
```

FIG. 14B

```
sumxg = sumxg + dz(i) * f / g
NEXT i

REM: CALCULATE THE ERROR IN XD errorx = sumx - xtotal gradient = (sumx - sumxg) / (.00001 * pguess)

PRINT "sumx"; sumx; sumxg; errorx; gradient

IF gradient = 0 THEN GOTO 89: REM: WE HAVE THE ANSWER pnew = pguess - errorx / gradient: REM: UPDATE THE GUESS

REM: GUARD AGAINST CRITICAL ANGLE BUT ALLOW TO CONVERGE

IF pnew > pmax THEN pnew = (pguess + pmax) / 2

PRINT pguess; pnew; pmax
REM: CHECK ERROR VERSUS TOLERANCE AND STORE THE END POINT OF THE ARRAY IF ABS(errorx) <= tolx THEN rayend(kntp) = xtotal + errorx: GOTO 89 pguess = pnew: GOTO 88: REM: CONTINUE ITERATION IF ERROR TOO LARGE

89 REM:  ITERATION IS DONE

REM: STORE THE ANSWERS
REM: keepp(kntp) = ray parameter    keepz(kntp) = diffractor depth keepp(kntp) = pguess: keepz(kntp) = ztarget NEXT ztarget
REM:  END OF DIFFRACTOR DEPTH LOOP SCREEN 9, 0: CLS : REM: put the screen in display mode GOSUB 2000: REM: draw the model grid and velocity layers REM: plot rays and calculate the travel times NB: MUST GO TO SUB FOR TIMES FOR i = 1 TO kntp: REM:  LOOP ON DIFFRACTOR DEPTHS
sumx = 0: sumz = 0: sumt = 0
p = keepp(i)

FOR j = 1 TO nlayer: REM: LOOP ON LAYERS  (PROPOGATE DOWNWARDS)
stheta = p * vi(j)
vt = vi(j)
IF ABS(stheta) > 1 THEN GOTO 33
ttheta = stheta / ((1 - stheta * stheta) ^ .5)

REM: STEP DOWN A LAYER dumx = (zi(j) - zi(j - 1)) * ttheta: dumz = (zi(j) - zi(j - 1))
```

FIG. 14C

```
REM: CHECK TO SEE IF DIFFRACTOR IS IN THE LAYER

IF sumz + dumz >= keepz(i) THEN
   xone = sumx: yone = sumz
   xtwo = xtotal
   dumz = (rayend(i) - sumx) / ttheta
   ytwo = yone + dumz
   GOSUB 3000
   GOTO 33: REM: FINISHED WITH RAY

ELSE : REM: PROPOGATE TO NEXT LAYER xone = sumx: xtwo = sumx + dumx
   yone = sumz: ytwo = sumz + dumz
GOSUB 3000
   sumx = sumx + dumx: sumz = sumz + dumz
END IF NEXT j 33 REM:
keept(i) = sumt: REM:  SAVE THE TRAVEL TIME TO THE i th DIFFRACTOR
NEXT i IF pause$ = "yes" THEN INPUT "next XD"; q$: REM: VIEW THE MODEL

CLS

REM: OUTPUT THE DIFFRACTOR MODEL TO DISK IF DESIRED

IF disk$ = "yes" THEN
   n$ = dev$ + ":m" + STR$(xtotal) + ".dat": REM: HERE WE USE XD TO NAME FILE
   PRINT n$
   OPEN n$ FOR OUTPUT AS #1
   PRINT #1, xtotal, kntp
   FOR ii = 1 TO kntp
   PRINT #1, keept(ii), keepz(ii), keepp(ii)
   NEXT ii
   CLOSE
END IF NEXT xtotal REM:   END OF XD (xtotal) LOOP

END

REM:  MODEL IS COMPLETE

2000 REM: plot routine :rem: DRAWS GRID
SCREEN 9, 0
sfx = .06: offx = 300: sfy = 1 / 15: offy = 20
COLOR 7
FOR isub = 0 TO nlayer
x1 = 10: x2 = 600
y1 = offy + zi(isub) * sfy
LINE (x1, y1)-(x2, y1)
NEXT isub
```

FIG. 14D

```
COLOR 3
FOR zt = 0 TO 5000 STEP 500
x1 = 10: y1 = zt * sfy + offy
x2 = 40: y2 = zt * sfy + offy
LINE (x1, y1)-(x2, y2)
NEXT zt
RETURN 3000 REM: plot routine :REM: DRAWS RAYS AND CALCULATES TIME
SCREEN 9, 0
sfx = .06: offx = 100: sfy = 1 / 15: offy = 20
COLOR 4
x1 = sfx * xtotal + offx: y1 = offy
x2 = x1: y2 = 5000 * sfy + offy
  LINE (x1, y1)-(x2, y2)
x1 = sfx * xone + offx: y1 = sfy * yone + offy
x2 = sfx * xtwo + offx: y2 = sfy * ytwo + offy
cc = 15
COLOR cc: LINE (x1, y1)-(x2, y2)
REM:   CALCULATE TRAVEL TIME
sumt = sumt + (((xone - xtwo) ^ 2 + (yone - ytwo) ^ 2) ^ .5) / vt
RETURN REM: THIS IS THE VELOCITY MODEL:  DEPTH, INTERVAL VELOCITY (PAIRS)
REM: LAST DEPTH SHOULD BE VERY DEEP (eg. RECORD TIME(secs) x 1000 (meters) )

DATA 200,1500
DATA 800,1600
DATA 1800,1800
DATA 2000,1800
DATA 2140,3200
DATA 2400,2000
DATA 3000,2500
DATA 5000,2800
```

FIG. 14E

```
REM: PROGRAM TO CALCULATE & RATIONALIZE DILATION MODEL

REM: CONFIDENTIAL AND PROPRIETARY INFORMATION OF MOBIL OIL CORPORATION

REM: PROGRAM READS DIFFRACTOR MODELS PREVIOUSLY CREATED

DIM zi(100), vi(100)
DIM keeppl(100), keepz1(100), keept1(100)
DIM keepp2(100), keepz2(100), keept2(100)
DIM tt(10, 100), sdip(10, 100), nbox(10)
DIM tto(10, 100), dilo(10, 100)
DIM order(100), control(10, 100)
CLS REM: dilfact = sweep length (secs) x boat velocity (m/sec) x 1000
dilfact = 20000

REM: READ MODEL PARAMETERS
disk$ = "yes"
IF disk$ = "yes" THEN
   n$ = "b:vel.dat"
   OPEN n$ FOR INPUT AS #1
   INPUT #1, nlayer
   FOR i = 1 TO nlayer
   INPUT #1, zi(i), vi(i)
   PRINT i, zi(i), vi(i)
   NEXT i
   CLOSE
END IF xmax = 4000: REM: last diffractor offset in the model data h = 2000: REM: current offset for this analysis ( NEED TO LOOP ON H )

stepdx = 200: REM: offset steps used for the diffractor model (SHOULD BE DRCVR)

REM: Define receiver spacing, V0 = velocity at surface, dt = sample interval drcvr = 12.5: v0 = vi(1): dt = .002

REM: Find Maximum Delay per Receiver Spacing
dtmax = drcvr / v0
ndtmax = INT(dtmax / dt): REM: In Samples REM: Find Number of Dip Gates from Receiver Gather FK Zones
ndips = 2 * ndtmax + 1
ndipmid = ndtmax + 1
PRINT ndtmax REM: SEARCH DIFFRACTOR MODEL FOR ALL DIFFRACTORS IN A RECEIVER DIP GATE THAT
REM: ARRIVE AT A SOURCE POINT h METERS AHEAD REM: xd1=Maximum -ve distance from receiver to diffractor location
REM: xd2=maximum +ve distance from receiver to diffractor location xd1 = h - xmax: xd2 = xmax

REM: LOOP ON ALL DIFFRACTOR DISTANCES FROM THE RECEIVER

FOR xd = xd1 TO xd2 STEP stepdx
```

FIG. 15A

```
srp = 1
REM: srp is a sign control for the receiver - we only modeled the positive dista
REM: Symmetry says that Arrival times at - X = times at + X but
REM:  Receiver Dip is reversed in sign IF xd < 0 THEN srp = -1

REM: xs=diffractor distance from source given an offset of h
xs = h - xd
REM:  Sign Convention for Source
ssp = -1
IF xd > h THEN ssp = 1
IF xd > h THEN xs = h - xd
REM: READ RECEIVER MODEL FILE
x1 = ABS(xd)
IF disk$ = "yes" THEN
   n$ = "b:a" + STR$(x1) + ".dat"
   PRINT n$
   OPEN n$ FOR INPUT AS #1
   INPUT #1, xtotal, kntp
   FOR ii = 1 TO kntp
   INPUT #1, keept1(ii), keepz1(ii), keepp1(ii)
   PRINT ii; keept1(ii); keepz1(ii); keepp1(ii)
   NEXT ii
   CLOSE
END IF
REM: READ COMPLIMENTARY SOURCE DISTANCE FILE
x1 = ABS(xs)
IF disk$ = "yes" THEN
   n$ = "b:a" + STR$(x1) + ".dat"
   PRINT n$
   OPEN n$ FOR INPUT AS #1
   INPUT #1, xtotal, kntp
   FOR ii = 1 TO kntp
   INPUT #1, keept2(ii), keepz2(ii), keepp2(ii)
   PRINT ii; keept2(ii); keepz2(ii); keepp2(ii)
   NEXT ii
   CLOSE
END IF
PRINT xd, xs; srp, ssp

REM: FOR A GIVEN RECEIVER DIP (BOX) STORE THE MODEL TIMES AND SOURCE DIPS

FOR i = 1 TO kntp sth1 = v0 * keepp1(i): sth2 = v0 * keepp2(i)
tapp1 = drcvr * keepp1(i): tapp2 = drcvr * keepp2(i)
irdip = srp * INT(tapp1 / dt + .5)

boxrdip = integer designation for the dip gate at the receiver
boxrdip = irdip + ndipmid REM: keep count the number of events on each constant receiver dip trace
nbox(boxrdip) = nbox(boxrdip) + 1

REM: Arrival time for events
tt(boxrdip, nbox(boxrdip)) = keept1(i) + keept2(i)
REM: sdip = source dip (actually the ray parameter)
sdip(boxrdip, nbox(boxrdip)) = ssp * keepp2(i)
```

FIG. 15B

```
NEXT i

NEXT xd

REM:  MODELS ARE COMPLETED.  FOR EACH RECEIVER DIP GATE WE HAVE A LIST
REM:  OF EVENT TIMES AND SOURCE DIPS.
REM:        now list by box FOR box = 1 TO ndips
PRINT box
   FOR i = 1 TO nbox(box)
   PRINT tt(box, i); -dilfact * sdip(box, i)
   NEXT i
NEXT box REM: now plot them FOR box = 1 TO ndips
   FOR i = 1 TO nbox(box)
   REM: dil = sweep dilation (in msecs)   +ve = longer
   t = tt(box, i): dil = -dilfact * sdip(box, i)
   cc = 15
   GOSUB 1000
   NEXT i
NEXT box INPUT ""; q$
CLS REM:  rearrange in ascending time FOR box = 1 TO ndips FOR ii = 1 TO nbox(box)
   control(box, ii) = 0: REM: control=0 means not ranked yet
   NEXT ii FOR i = 1 TO nbox(box)
   mint = 10000

FOR j = 1 TO nbox(box)
     IF control(box, j) <> 1 THEN IF tt(box, j) <= mint THEN mint = tt(box, j):
     NEXT j tto(box, i) = tt(box, holdj)

REM: tto = times in ascending order, dilo = dilation at that time dilo(box, i) = -dilfact * sdip(box, holdj)
   control(box, holdj) = 1
   NEXT i REM: DEFINE THE HORIZONTAL PATH at T = h/v0 tmin = h / v0: dilmax = dilfact / v0
   dilo(box, 0) = dilmax: tto(box, 0) = tmin: control(box, 0) = 1

REM:  RATIONALIZE THE DILATION VS. TIME MODEL
REM:   FIRST FIND THE "ZERO" CROSSING EVENT
REM:  by: find last +ve dilation such that that there are no smaller positives
```

FIG. 15C

```
REM:  at later times.

dilomin = 1000
   FOR i = 0 TO nbox(box)
   IF dilo(box, i) > 0 THEN
       test = 0
         FOR j = 0 TO i
           IF test <> 1 THEN IF dilo(box, i) > ABS(dilo(box, j)) THEN test = 1
         NEXT j
     IF test = 0 THEN IF dilo(box, i) < dilomin THEN dilomin = dilo(box, i): hold i = i
   END IF
   NEXT i REM:  rationalize down to "zero" crossing - put them in monotonic descending
   REM:  order.

test = dilo(box, 0)
   FOR i = 0 TO holdi
   control(box, i) = 0
   IF dilo(box, i) > 0 THEN
   IF dilo(box, i) <= test THEN
         control(box, i) = 1: REM: control=1 means it is a valid control point
         test = dilo(box, i)
   END IF
   END IF
   PRINT i, tto(box, i); dilo(box, i); control(box, i)
   NEXT i REM:  below the zero crossing  Search for smallest absolute value negative
   REM:  dilation.  This is a conrol point. Then start there and look below
   REM:  for the next smallest absolute value negative  etc.

888 dilomin = 1000
    holdi2 = 0
    FOR i = holdi + 1 TO nbox(box)
        control(box, i) = 0
        test = ABS(dilo(box, i))
        IF dilo(box, i) < 0 THEN IF test < dilomin THEN dilomin = test: holdi2 = i
    NEXT i PRINT "bbb"; dilomin, holdi2; dilo(box, holdi2)
    IF dilomin <> 1000 THEN control(box, holdi2) = 1: PRINT "LLL"; holdi2

REM:INPUT "yy"; q$
    IF dilomin = 1000 THEN GOTO 889
    holdi = holdi2: GOTO 888
889 REM:
NEXT box REM: We now have a "rationalized" dilation function for the offset h trace
REM: for each receiver dip slice.

INPUT "final plot "; q$
CLS
FOR box = 1 TO ndips
   t1 = tto(box, 0): dil1 = dilo(box, 0)
   FOR i = 0 TO nbox(box)
   t = tto(box, i): dil = dilo(box, i)
   cc = 11: IF control(box, i) = 1 THEN cc = 15
```

FIG. 15D

```
    GOSUB 1000
    IF control(box, i) = 1 THEN
        t2 = t: dil2 = dil
        GOSUB 2000
        t1 = t2: dil1 = dil2
    END IF
    NEXT i REM: Draw to 5 seconds (model should be big enough to go to last time)

IF t1 < 5 THEN
        t2 = 5: dil2 = dil1: GOSUB 2000
    END IF

NEXT box

END

REM:    PLOTTING SUBROUTINES

1000 : REM: sub to plot dilation at time t
SCREEN 9, 0
sfx = 2.8: offx = box * 60
sfy = 60: offy = 10
COLOR 7
    x1 = 10: x2 = 600
    REM: plot scales
    FOR ts = 0 TO 5
    y1 = offy + sfy * ts: y2 = y1
    LINE (x1, y1)-(x2, y2)
    NEXT ts
    x1 = offx: x2 = offx: y1 = offy: y2 = 300
    COLOR 7: LINE (x1, y1)-(x2, y2)
COLOR cc x1 = offx: x2 = x1 + dil * sfx
y1 = offy + sfy * t: y2 = y1
LINE (x1, y1)-(x2, y2)
RETURN 2000 : REM: sub to plot
SCREEN 9, 0
sfx = 2.8: offx = box * 60
sfy = 60: offy = 10
COLOR 15
x1 = offx + dil1 * sfx: x2 = offx + dil2 * sfx
y1 = offy + sfy * t1: y2 = offy + sfy * t2
LINE (x1, y1)-(x2, y2)
RETURN
```

*FIG. 15E*

METHOD AND APPARATUS FOR DOPPLER SMEAR CORRECTION IN MARINE SEISMOLOGY MEASUREMENTS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

The present invention relates generally to marine seismology, in which a moving ship generates seismic waves and detects reflections. Still more particularly, the invention relates to processing the reflected seismic waves to correct for the motion of the ship.

2. Background of the Invention

The field of seismology focuses on the use of artificially generated elastic waves to locate mineral deposits such as hydrocarbons, ores, water, and geothermal reservoirs. Seismology is also used for archaeological purposes and to obtain geological information for engineering. Exploration seismology provides data that, when used in conjunction with other available geophysical, borehole, and geological data, can provide information about the structure and distribution of rock types and their contents.

Most oil companies rely on interpretation of seismic data for selecting the sites in which to invest in drilling exploratory oil wells. Despite the fact that seismic data is used to map geological structures rather than finding petroleum directly, the gathering of seismic data has become a vital part of selecting the site of an exploratory and development well. Experience has shown that the use of seismic data greatly improves the likelihood of a successful venture.

Seismic data acquisition is routinely performed both on land and at sea. At sea, seismic ships deploy a streamer or cable behind the ship as the ship moves forward. The streamer includes multiple receivers in a configuration generally as shown in FIG. 1. Streamer 110 trails behind ship 100 which moves in the direction of the arrow 102. As shown in FIG. 1, source 112 is also towed behind ship 100. Source 112 and receivers 114 typically deploy below the surface of the ocean 104. Streamer 110 also includes electrical or fiber-optic cabling for interconnecting receivers 114, and the seismic equipment on ship 100. Streamers are usually constructed in sections 25 to 100 meters in length and include groups of up to 35 or more uniformly spaced receivers. The streamers may be several miles long and often a seismic ship trails multiple streamers to increase the amount of seismic data collected. Data is digitized near the receivers 114 and is transmitted to the ship 100 through the cabling at rates of 7 (or more) million bits of data per second. Processing equipment aboard the ship controls the operation of the trailing source and receivers and processes the acquired data.

Seismic techniques estimate the distance between the ocean surface 104 and subsurface structures, such as structure 106 which lies below the ocean floor 108. By estimating the distance to a subsurface structure, the geometry or topography of the structure can be determined. Certain topographical features are indicative of oil and/or gas reservoirs.

To determine the distance to subsurface structure 106, source 112 emits seismic waves 116 which reflect off subsurface structure 106. The reflected waves are sensed by receivers 114. By determining the length of time that the seismic waves 116 took to travel from source 112 to subsurface structure 106 to receivers 114, an estimate of the distance to subsurface structure 106 can be obtained.

The receivers used in marine seismology are commonly referred to as hydrophones, or marine pressure phones, and are usually constructed using a piezoelectric transducer. Synthetic piezoelectric materials, such as barium zirconate, barium titanate, or lead mataniobate, are generally used. A sheet of piezoelectric material develops a voltage difference between opposite faces when subjected to mechanical bending. Thin electroplating on these surfaces allows an electrical connection to be made to the device so that this voltage can be measured. The voltage is proportional to the amount of mechanical bending or pressure change experienced by the receiver as resulting from seismic energy propagating through the water. Various types of hydrophones are available such as disk hydrophones and cylindrical hydrophones.

Two major types of seismic sources are used to generate seismic waves for the seismic measurements. The first major source type comprises an impulsive source which generates a high energy, short time duration impulse. The time between emission of the impulse from the source and detection of the reflected impulse by a receiver is used to determine the distance to the subsurface structure under investigation. The impulsive source and the associated data acquisition and processing system are relatively simple. However, the intensity of energy required by seismic techniques using impulsive sources may, in some situations, be harmful to marine life in the immediate vicinity of source 112.

The environmental concerns associated with impulsive sources has lead to the use of another type of seismic source which generates a lower magnitude, extended duration, vibratory energy. The measurement technique which uses such a source is referred to as the marine vibratory seismic ("MVS") technique. Rather than imparting a high magnitude pressure pulse into the ocean in a very short time period, vibratory sources emit lower amplitude pressure waves over a time period typically between 5 and 7 seconds, but longer time periods are also possible. The frequency of the vibrating source varies from about 5 to 150 Hz, although the specific low and high frequencies differ from system to system. The frequency of the source may vary linearly or nonlinearly with respect to time. Such a frequency variation pattern is commonly called a "frequency sweep". The frequency sweep is thus between 5 and 150 Hz in frequency and 5 to 7 seconds in duration. The magnitude of the seismic wave oscillations may vary or remain at a constant amplitude. The amplitude of the oscillations, however, are much lower than the magnitude of impulsive sources and thus, there are fewer environmental concerns with the MVS seismic technique.

Seismic ships must move forward while seismic measurements are being recorded for many reasons. The hydrophones 114, along with connecting wires and stress members provided on the streamers, are typically placed inside a neoprene tube (not shown in FIG. 1) 2.5–5 inches in diameter. The tube is then filled with sufficient lighter-than-water liquid to make the streamer neutrally buoyant. When the streamer is moving forward, a diverter 118 pulls the streamer 114 out to an appropriate operating width. Depth controllers (not shown) are fastened to the streamer at various places along its length. These devices sense the hydrostatic pressure and tilt bird wings so that the flow of water over them raises or lowers the streamer to the desired depth. The depth that the controllers seek to maintain can be controlled by a signal sent through the streamer cabling and thus the depth can be changed as desired.

For the streamer's depth control system to function effectively, the ship 100 must travel forward at a speed through the water of approximately four knots. Additionally, since streamer 110 is normally a flexible cable, the ship must move forward to maintain a desired fixed separation between the sources 112 and streamers 110. The spacing between sources and streamers is important in the marine seismology and must not vary while seismic measurement are made.

Forward motion is also necessary for the operation of diverter(s) 118. When seismic ships deploy multiple streamers, the diverters are used to provide fixed separation between streamers. These diverters force the streamers laterally as the boat moves forward. Without the diverters, the streamers may become entangled. The relative velocity of the water around the diverters and the angle of attack determine the amount of separation between streamers.

Forward motion of the ship is additionally beneficial because it allows the seismic ships to cover as much ocean surface as possible each day. For these reasons and others, seismic ships must move forward while taking measurements and the forward speed must be reasonably constant. Typical ship speed is approximately 2–3 meters per second. Because the streamer is deployed behind the ship, the source and receivers also move at approximately 2.5 meters per second.

Marine seismic measurements can also be made using a technique called "on-bottom cable" (OBC) in which a ship lays one or more cables containing hydrophones and geophones on the ocean floor. This ship remains stationary and records data while collecting seismic data. A second ship containing sources moves parallel, or at some other angle, to the cables. In the OBC technique, the receivers do not move, but the sources are moving and thus, the acquired data may be distorted. Further, in special circumstances, some of the receivers can be on land. Although OBC is generally more expensive than towed marine seismic measurements, OBC may be necessary if land obstructions, such as an island, are located in the survey area.

Although ship motion is necessary as described above, the motion distorts or "smears" the acquired seismic data. Broadly, smearing results from the fact that the ship, and thus the sources and receivers, move while data collection takes place. Data smearing in a MVS system includes significant contributions from both receiver and source motion. Thus, the MVS-acquired data should be corrected for both receiver and source motion. Previous attempts to correct for ship motion have relied on a constant-velocity assumption that is inexact for most geological structures.

It would be advantageous to provide a practical seismic system for use in marine applications that can correct the data for the motion of the ship. Such a system preferably would correct for both receiver and source motion and do so in a cost effective manner.

BRIEF SUMMARY OF THE INVENTION

A seismic system is provided with an improved method of reducing distortions caused by motion of a source and receiver in marine seismic measurements. In one embodiment, the seismic system comprises a seismic source, a seismic receiver, a source/receiver interface unit, a processing unit, a data storage unit, a display device, and a user input device. The processing unit is configured to receive seismic measurements from the seismic receiver and to create a seismic velocity model from the received data. The processing unit uses the velocity model to calculate a dilation function that is indicative of distortion caused by motion of the seismic source. Preferably, the processing unit corrects the seismic measurements for this distortion by computing a transform of the seismic measurements, partitioning the transformed measurements into "dip slices", inverse transforming the individual dip slices, correcting the dip slice measurements according to the dilation function, and adding the corrected dip slice measurements together to obtain the corrected seismic measurements.

The disclosed system and method may advantageously provide for more accurate correction for source motion, which in turn yields seismic data having substantially reduced "smear" when ensemble averaging is performed to reduce seismic noise. The computational requirements of the disclosed method are not believed to be burdensome.

BRIEF DESCRIPTION OF THE DRAWINGS

A better understanding of the present invention can be obtained when the following detailed description of the preferred embodiment is considered in conjunction with the following drawings, in which:

FIGS. 14A–14E provide a computer code listing for determining travel times for seismic waves reflecting off of a set of diffractors; and FIGS. 15A–15E provide a computer code listing for determining and rationalizing a dilation function for various dip slices.

DETAILED DESCRIPTION OF THE PREFERRED EMBODIMENTS

The earth can be thought of as a filter of seismic energy. That is, if seismic signal energy is input into the earth, a receiver positioned on the surface of the earth will receive seismic signal energy whose character has been altered by the earth. The intent of seismic work is to identify primary reflections from diffractors which typically comprise subsurface interfaces. In practice, the receivers record not only primary seismic reflections, but also multiples, diffractions, scattered waves, reflected refractions, surface waves, and the like, all overlapping in time.

Generally, a filter is a linear system that produces an output signal for a given input signal. Given any input signal, the corresponding output signal can be calculated if the impulse response for the filter is known. The impulse response is defined as the output signal produced by the filter for an impulse input signal. The output signal is simply the input signal convolved with the impulse response of the filter.

The seismic signal detected by the receivers represents the input reference signal influenced by a variety of linear and nonlinear factors. Seismic data (or "seismograms") is useful to determine the location of oil and gas reservoirs when the data represents the input reference signal acted upon only by the diffractors comprising the subsurface interfaces, as contrasted with a reference input signal that is also influenced by nonlinear, signal-altering factors such as the Doppler effect created by motion of the source and/or receivers.

The ideal impulse response of the earth is the effect that the diffractors have on the seismic waves propagating through the earth. Because of nonlinear, signal altering factors, the seismic signal received by the receivers in a MVS recording often bears little resemblance to the impulse response of the earth. Seismic work is intended to identify the impulse response of the earth by removing the influences on the data that are not of interest to seismologists.

The present invention corrects seismic data collected by a marine seismic system for the nonlinear Doppler effects caused by the motion of the towed seismic receivers and sources. For simplicity, the technique will be described with reference to a "diffractor" (also called a "scatterer") which is a reflecting point located at the interface between contiguous subsurface formations. Because a subsurface interface is comprised of many point diffractors, the entire interface can be mapped by merely superimposing the results from each point diffractor.

Figure 2:
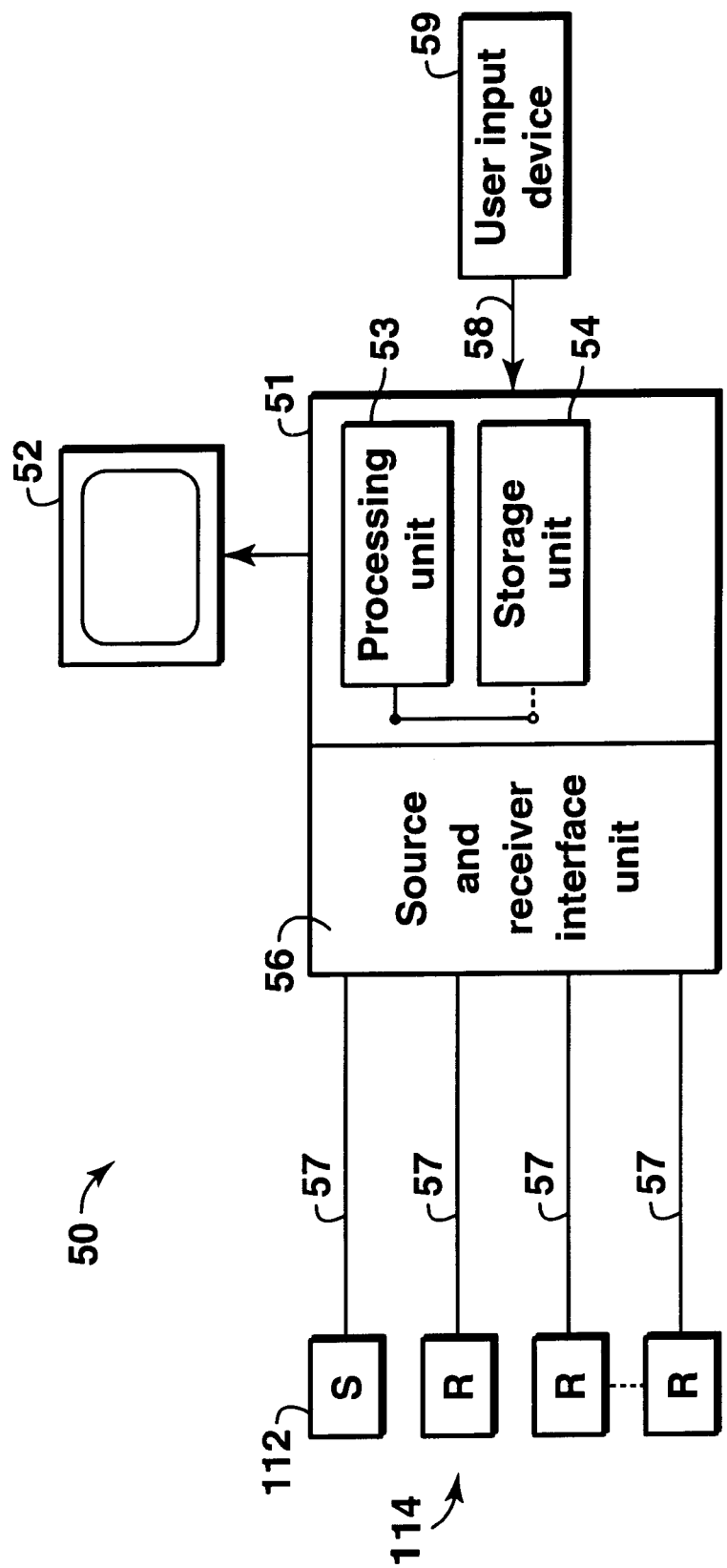
FIG. 2 shows a seismic measurement system in accordance with the preferred embodiment of the present invention.

Referring now to FIG. 2, a seismic system 50 constructed in accordance with the preferred embodiment generally includes a seismic measurement and processing system 51, a user input device 59 (preferably a keyboard, buttons, switches, and control knobs), a display device 52, one or more seismic sources 112, and one or more cables (also called streamers) of seismic receivers 114. The collection of all receivers for a shot is also referred to as a "shot gather." The seismic measurement and processing system 51 includes a processing unit 53 coupled to a data storage unit 54, and source and receiver interface unit 56. It should be recognized that the seismic measurement system 50 may include other components not shown in FIG. 2. The user input device 59 allows a user to input commands and configuration information into the system 50. The display device 52 provides visual representations of data, configuration information, and status information to the user. The source and receivers preferably couple to the seismic measurement system via fiber-optic cables 57. The source 112 includes any suitable seismic source such as MVS sources and impulsive sources. Receivers 114 includes suitable hydrophone receivers including piezoelectric-based devices or any other suitable type of seismic receiver.

The processing unit preferably controls the operation of the seismic measurement system 50, storing data in storage unit 54 (which preferably is a magnetic tape, a hard disk. or CD ROM drive), and controlling the operation of the source 112 and receivers 114. Seismic signals detected by the receivers are transmitted to the seismic measurement system, processed by processing unit 53 and stored in storage unit 54.

Figure 1:
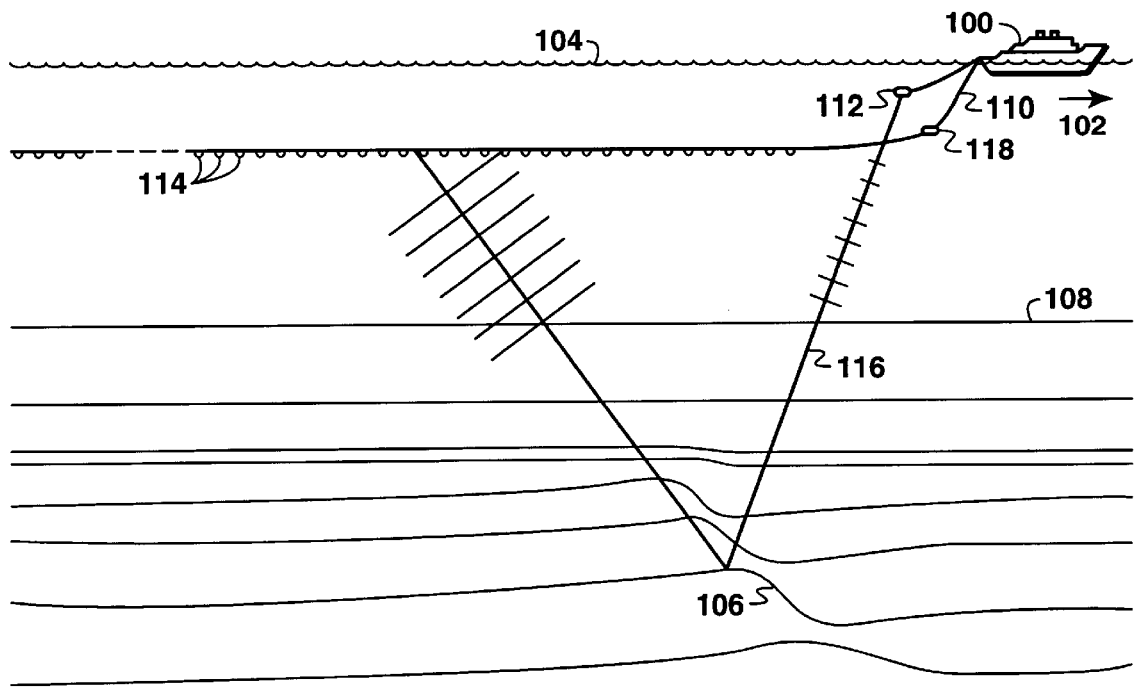
FIG. 1 shows a ship for making seismic measurements with a towed streamer array including a seismic source and multiple receivers.
Figure 3:
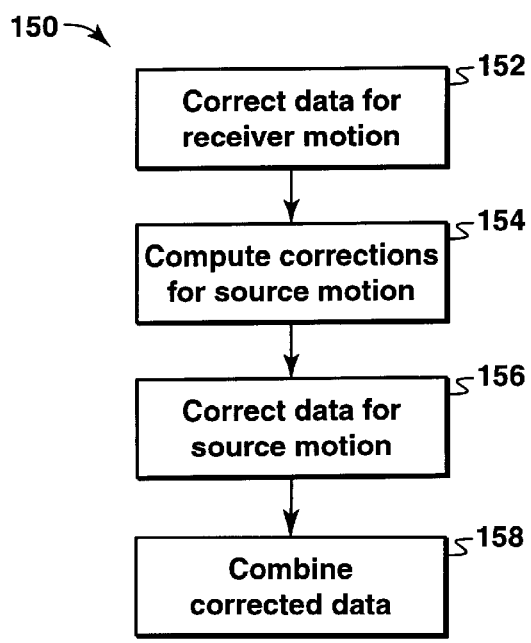
FIG. 3 shows the preferred method of correcting seismic data for the distortion caused by motion of the source and receivers.

Referring now to FIGS. 2 and 3, and explained in more detail in the discussion that follows, the seismic measurement and processing system 51 preferably corrects the recorded seismic data for the motion of the receivers 114 and the source 112 according to the methodology illustrated in flow chart 150. Alternatively, the seismic data can be stored on magnetic tape or disk and transferred to another computer system for analysis according to the teachings of the preferred embodiment at a location remote from the seismic ship. The preferred data correction method corrects first for the effect of receiver motion in step 152, and then calculates corrections for the effect of source motion in step 154, applying the corrections in step 156. The corrected data from multiple receivers, and possibly multiple shots, is combined in step 158 to provide a noise-reduced signal which may be subsequently analyzed to determine geologic structures. Each of these steps is explained below.

Correction for Receiver Motion (step 152)

Figure 4:
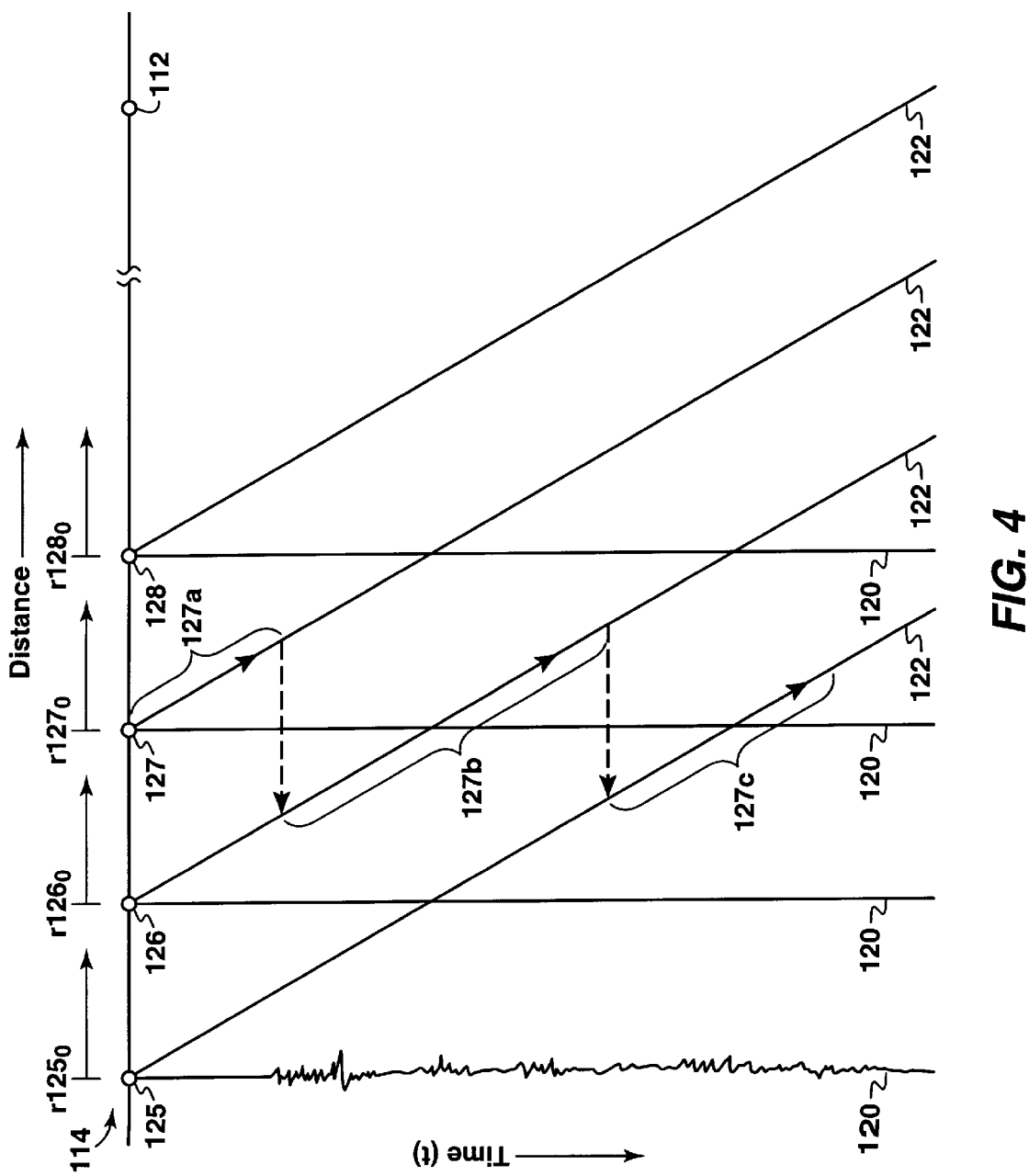
FIG. 4 shows exemplary pressure data from multiple receivers and the distorting effect of receiver motion on the data.

Referring now to FIG. 4, a shot gather 114 of receivers 125, 126, 127, 128 is shown with a pressure signal 120 recorded by each receiver. The pressure signals 120 are referred to collectively as a "shot record." Time is represented along the vertical axis and distance is represented across the horizontal axis. An exemplary trace is shown for one receiver 125 and, for simplicity, a straight line is used to represent the remaining trace records.

If the receivers did not move while recording the shot records, the traces 120 would be recorded at a fixed location and therefore would be a function only of time, and not space. Because the receivers are towed behind a moving ship (assumed to be moving to the right in FIG. 4), each shot record is recorded as a function, not only with respect to time, but also space, as indicated by traces 122 for each receiver. Traces 122 represent traces 120 as the receiver is pulled behind the ship. Thus, each data point on the shot records 122 represents the seismic pressure signals sensed by the receiver at a particular point in time and space.

Referring still to FIG. 4, each receiver is assumed to be located at position $r_0$ when the shot record begins. Thus, receiver 125 begins at location $r125_0$. Receiver 126 begins at location $r126_0$, receiver 127 at location $r127_0$, and receiver 128 at location $r128_0$. The distance between the initial location $r_0$ and the ending position is a function of the speed of the receivers. It is assumed for purposes of this discussion that the speed of the receivers, as well as the speed of the sources, is the same as the speed of the ship, although in theory slight differences in the speeds may exist due to such factors as the elasticity of the streamer 110.

Shot records 122 are represented in FIG. 4 as straight diagonal lines. The lines (representing pressure waveforms) are straight because the receiver speed is assumed to be constant. If the receiver speed is $u_r$, then the position of each receiver at any time t during a shot record is $r_0 + u_r t$. The linear slanting of the shot records 122 is equivalent to a time-variant spatial shift. If $p(s, u_s, S(t), r, u_r, t)$ represents the magnitude (pressure) p of the shot record as a function of source location s, source speed $u_s$, seismic signal S(t) produced by the source, receiver location r, receiver speed $u_r$, and time t, then time variant spatial shift can be mathematically modeled as the convolution of $p(s,u_s,S(t),r,u_r,t)$ with a "Dirac" delta function (also referred to as a "unit impulse"):

$$p(s,u_s,S(t),r=r_0+u_r t,u_r,t)=p(s,u_s,S(t),r_0,u_r,t)*\delta(r_0+u_r t) \qquad (2)$$

where the * operator denotes convolution and $\delta$ denotes a delta function. For a detailed explanation of convolution, reference can be made to "Exploration Seismology," by Sheriff and Geldart, published by the Press Syndicate of the University of Cambridge, 1995, p. 279–81.

The spatial shift represented by $\delta(r_0+u_r t)$ in equation (2) can be removed by convolving the result in equation (2) with a spatial shift in the opposite direction. The correction for receiver motion is therefore:

$$p(s,u_s,S(t),r_0,0,t)=p(s,u_s,S(t),r=r_0+u_r t,u_r,t)*\delta(r_0-u_r t). \qquad (3)$$

In equation (3), convolution of the spatially shifted shot record with the delta function $\delta(r_0-u_r t)$ results in a shot record had the receiver been stationary ($u_r=0$) at position $r_0$. Thus, the effect of receiver motion on the shot record is neutralized by convolving the shot record with a delta function representing a spatial shift. It should be recognized that the foregoing analysis involves functions and mathematical operations that occur as functions of time and space (the so called time and space domains).

Other ways to correct the shot records for receiver motion are available. For example, the correction provided in equation (3) can also be represented in the frequency domain in which all functions vary with frequency, not time. Functions can be converted from their time and space domain representations to the frequency domain using a mathematical operation called a Fourier transform. The frequencies involved with such Fourier transforms include temporal and spatial frequencies. The Fourier transform of the delta function, $\delta(r_0-u_r t)$, is $e^{-i2\pi k u_r t}$ where i represents the square root of −1 (an imaginary number), k represents the spatial frequency (also referred to as the wavenumber) and $\pi$ is a known constant. It is well known that convolution in the time and space domains is equivalent to multiplication in the frequency domain. Thus, the spatial shift introduced in equation (3) to counterbalance the spatial shift caused by the receiver motion can be represented in the frequency domain as the product of the Fourier transforms of the shot record and $e^{-i2\pi k u_r t}$:

$$P(f,k) \cdot e^{-i2\pi k u_r t} \qquad (4)$$

Where P(f, k) is the two-dimensional Fourier transform of the shot record and is a function of temporal frequency f and spatial frequency k. The symbol "•" denotes multiplication.

Figure 5:
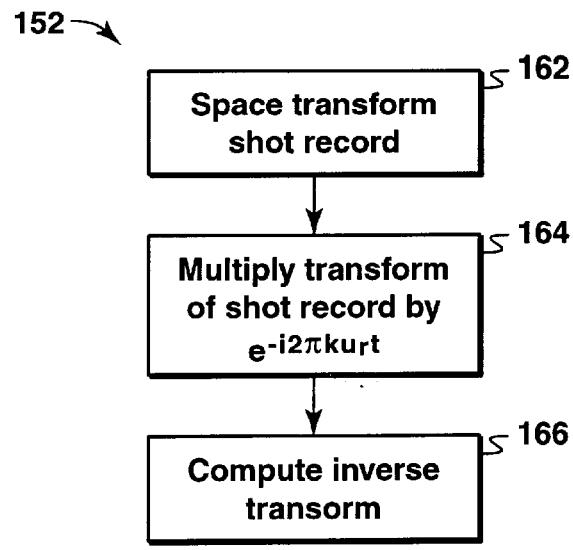
FIG. 5 shows a preferred method for correcting seismic data for the distortion caused by receiver motion.

Referring now to FIGS. 2, 3 and 5, the seismic measurement system 50 may remove the effect of receiver motion using equation (4) by first computing the Fourier transform of the shot records in step 162. The seismic measurement and processing system 51 computes the Fourier transform using any one of a variety of known techniques such as the Fast Fourier Transform. It should be recognized that any suitable transform, such as Laplace, Radon, and $\tau$-p transforms, can be used as well. In step 164, the seismic measurement and processing system 51 multiplies the Fourier transform of the shot records by the Fourier transform of the delta function of equation (3) represented as $e^{-i2\pi k u_r t}$. Finally, in step 166, the product from step 164 may be converted back into the time and space domain through an operation referred to as the inverse Fourier transform which also is a known technique. It is noted that if subsequent processing steps are to be computed in the transform domain, the inverse transform step 166 may be postponed or dropped to avoid needless computation.

Another method for correcting for receiver motion is described with reference to FIG. 4 to correct the shot record for the motion of the receivers. This method will be described with reference to one such receiver, such as receiver 127. In this method, the seismic measurement and processing system 51 selects data from a receiver while the receiver is near the location at which the shot record is to be fixed. To fix the shot record for location $r127_0$, for example, the seismic measurement system selects the portion of shot records from receivers 127, 126, and 125 when each receiver is near location $r127_0$. The portion of the shot records to be selected by seismic measurement and processing system 51 is identified by reference numbers 127a, 127b, and 127c. Thus, seismic measurement system selects the initial portion 127a of the shot record from receiver 127 until that receiver moves a distance approximately equal to one-half the group interval away from location $r127_0$. At that point, seismic measurement and processing system 51 selects the middle portion 127b of the shot record from receiver 126 until that receiver also moves one-half the group interval away from location $r127_0$. Finally, the last portion 127c of the shot record from receiver 125 is selected by the system 51.

Thus, any one of several techniques may be used to correct for receiver motion in step 152 of FIG. 3. It is noted that receiver motion correction of any kind is unnecessary if on-bottom cable (OBC) techniques are used. The methods described above are exemplary only of the methods for correcting for receiver motion and the invention is not intended to be limited to the use of any particular method.

The receiver-motion corrected data is sometimes referred to as "fixed receiver data". Preferably following receiver motion correction, the seismic measurement and processing system 51 determines source-motion corrections for the fixed receiver data.

Determining Source Motion Corrections (step 154)

The motion of the source creates an apparent shift in frequency which is a function of time and direction. When the velocity of seismic waves through the earth is assumed to be constant, correction for source motion may be made by applying an analytically determined time-and-direction-dependent phase shift to the fixed-receiver data. One such approach is described in U.S. patent application Ser. No. 09/120,410, now U.S. Pat. No. 6,049,507, entitled "Method and Apparatus for Correcting Effect of Ship Motion in Marine Seismology Measurements" by inventor K. Paul Allen, and hereby incorporated herein by reference. However, this assumption is often unrealistic, and in many situations the resulting corrections may be inaccurate. In step 154, this assumption is eliminated by constructing a non-constant velocity model to determine phase corrections having an increased accuracy.

Figure 6:
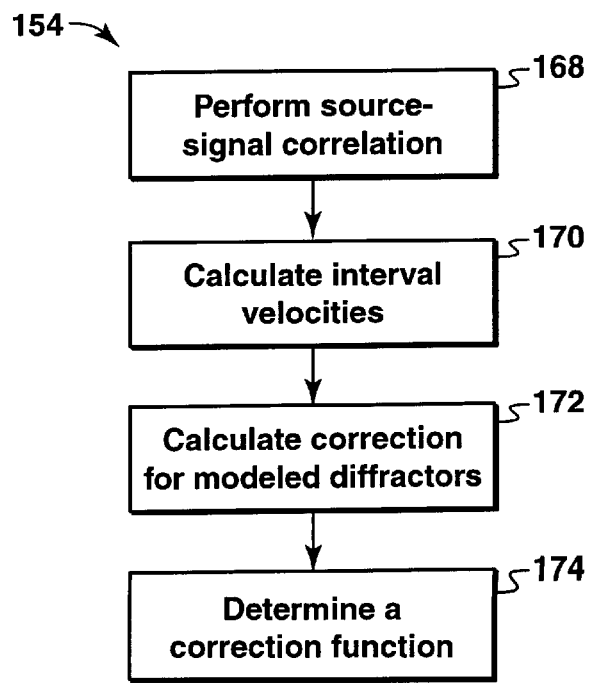
FIG. 6 shows a preferred method for determining corrections for distortion caused by source motion.

Referring to FIG. 6, in the preferred method 150 for determining source motion corrections for the data, the seismic measurement and processing system 51 correlates the fixed receiver data with the signal emitted by the seismic source 112, e.g. a MVS sweep signal. The correlation step 168 filters out out-of-band noise and "concentrates" signal energy from long-sweep reflection events into short duration events. Correlation of two data sequences is a known mathematical operation in which one data sequence is displaced by varying amounts relative to the other data sequence and corresponding values of the two sequences are multiplied together and the products summed to give the value of the correlation.

In step 170, the correlated data is used to calculate interval velocities. As explained by Sheriff and Geldart on pages 91–95 and 128–138 in Exploration Seismology, 2ed. (hereby incorporated by reference), many suitable methods exist for determining the velocity of seismic waves as a function of depth. In one exemplary method (known as the $x^2$-$t^2$ method), a plot of the squared arrival times ($t^2$) of reflected energy as a function of squared horizontal distance ($x^2$) between the source and receivers yields a series of curves. The slopes of the curves near the source position (x=0) are approximately equal to the inverse of the average square velocity ($1/V^2$) of the seismic waves during their travel to and from the cause of the reflection. From these slopes, a series of root-mean-square velocities ($V_{rms}$) can be calculated. From the series of rms velocities, interval velocities can be found using the "Dix formula":

$$V_{int,n}^2 = (V_{rms,n}^2 t_n - V_{rms,n-1}^2 t_{n-1})/(t_n - t_{n-1}) \quad (5)$$

where $t_n$ is the arrival time of the nth seismic energy curve at the source position (at x=0), and where $V^2_{rms,n}$ is the inverse of the slope of the curve at the source position. The interval velocities $V_{int,n}$ are the estimated seismic wave velocities through increasing depth layers of the earth (the layers between the reflections). The thickness of each of the layers can be estimated by:

$$Z_n = V_{int,n}(t_n - t_{n-1})/2 \quad (6)$$

where $Z_n$ is the thickness of the nth layer.

Figure 7:
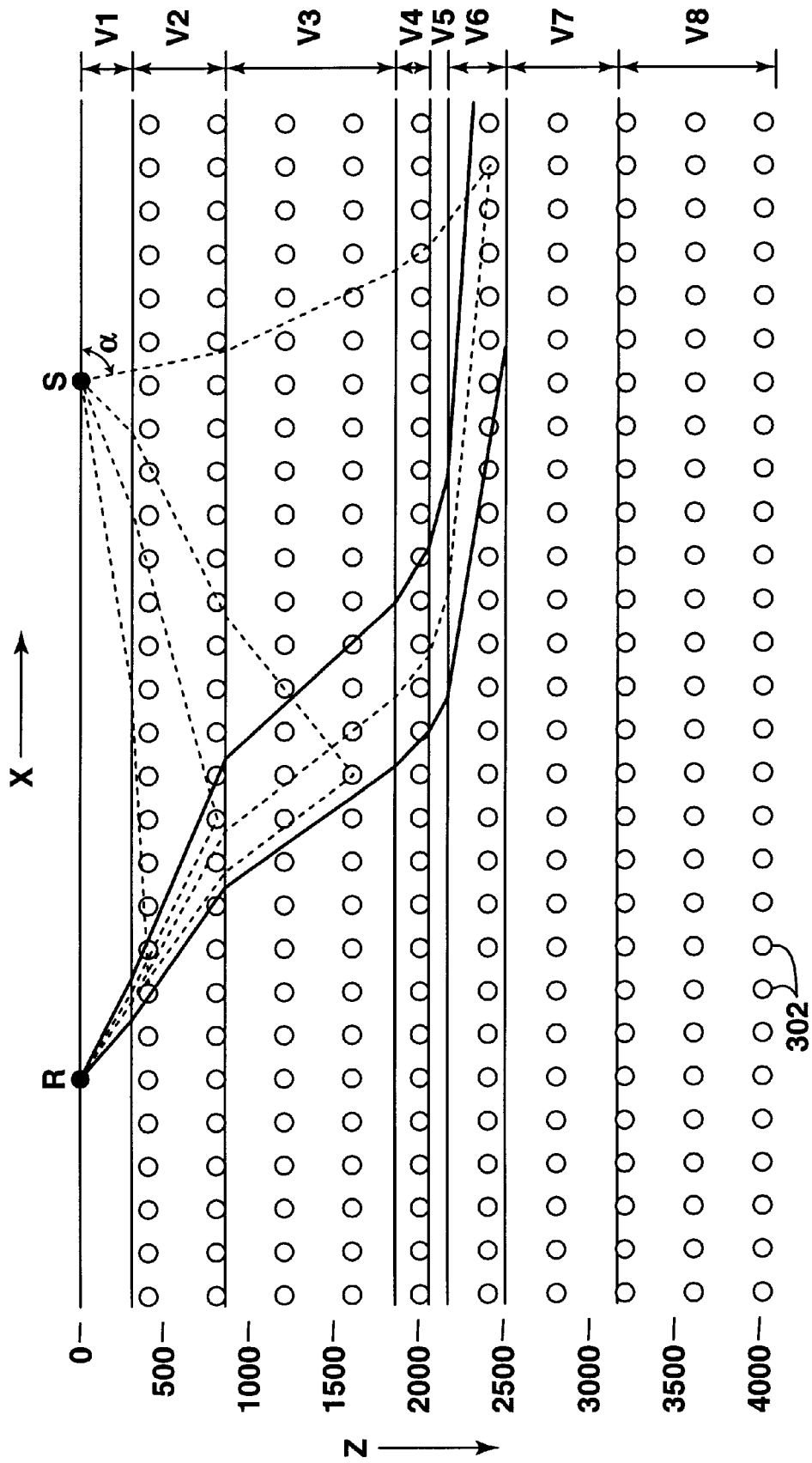
FIG. 7 shows a varying-velocity model of the earth which is used in the method of FIG. 6.

In step 172, a model is constructed from these calculated values which specifies the seismic wave velocity as a function of depth (see FIG. 7). The model assumes that the earth consists of horizontal layers (or optionally, spherical layers around the center of the earth) each having a constant thickness and seismic wave velocity as calculated from the correlated data. The dimensions of the model, both in terms of horizontal and vertical extent, are preferably sufficient to determine corrections for the entire record time.

Referring still to FIG. 7, a collection of diffractors 302 regularly spaced at various locations and depths is assumed to be present within the dimensions of the model. The depth spacing of the diffractors 302 is preferably about 200 meters and the horizontal spacing is preferably about the same as the spacing between the receivers. For each receiver $R_i$, assume diffractor $D_i(x,z)$ refers to a diffractor at a horizontal distance x and a depth z from the receiver $R_i$. For each diffractor $D_i(x,z)$, a reflection path $P(D_i(x,z))$ can be traced from the source S, off the diffractor $D_i(x,z)$, and to the receiver $R_i$. Each such path has a travel time $t(D_i(x,z))$ and a source dip angle $\alpha(D_i(x,z))$ associated with it. The source dip angle is the angle of the initial path leg downward from the direction of the source's motion.

In one implementation of step 172, processing system 51 performs a determination of the travel times and source dip angles for each diffractor $D_i(x,z)$. FIGS. 14A–14E show source code in BASIC for calculation of these values for one column of refractors. Execution of this computer program can be repeated for each column of refractors in the velocity model. Subsequently, the processing system 51 partitions the diffractors into sets that are each "illuminated" by a chosen dip angle region from receiver $R_i$. FIG. 7 shows an exemplary dip angle region from receiver $R_i$ illuminating a set of diffractors (shown in darker outline). A few exemplary paths for the diffractors in the set are also shown.

Once the set of diffractors illuminated by a chosen dip angle is identified, a correction to data reaching the receiver from that direction may be determined in the following manner. The fractional dilation for a seismic signal received by the receiver is:

$$d = (\cos \alpha) V_S/V_1 \quad (7)$$

where $\alpha$ is the source dip angle, $V_S$ is the velocity of the source, and $V_1$ is the interval velocity of the first layer. Once the dilation factor is known, a correction for the source motion may be made to the received data.

Figure 8:
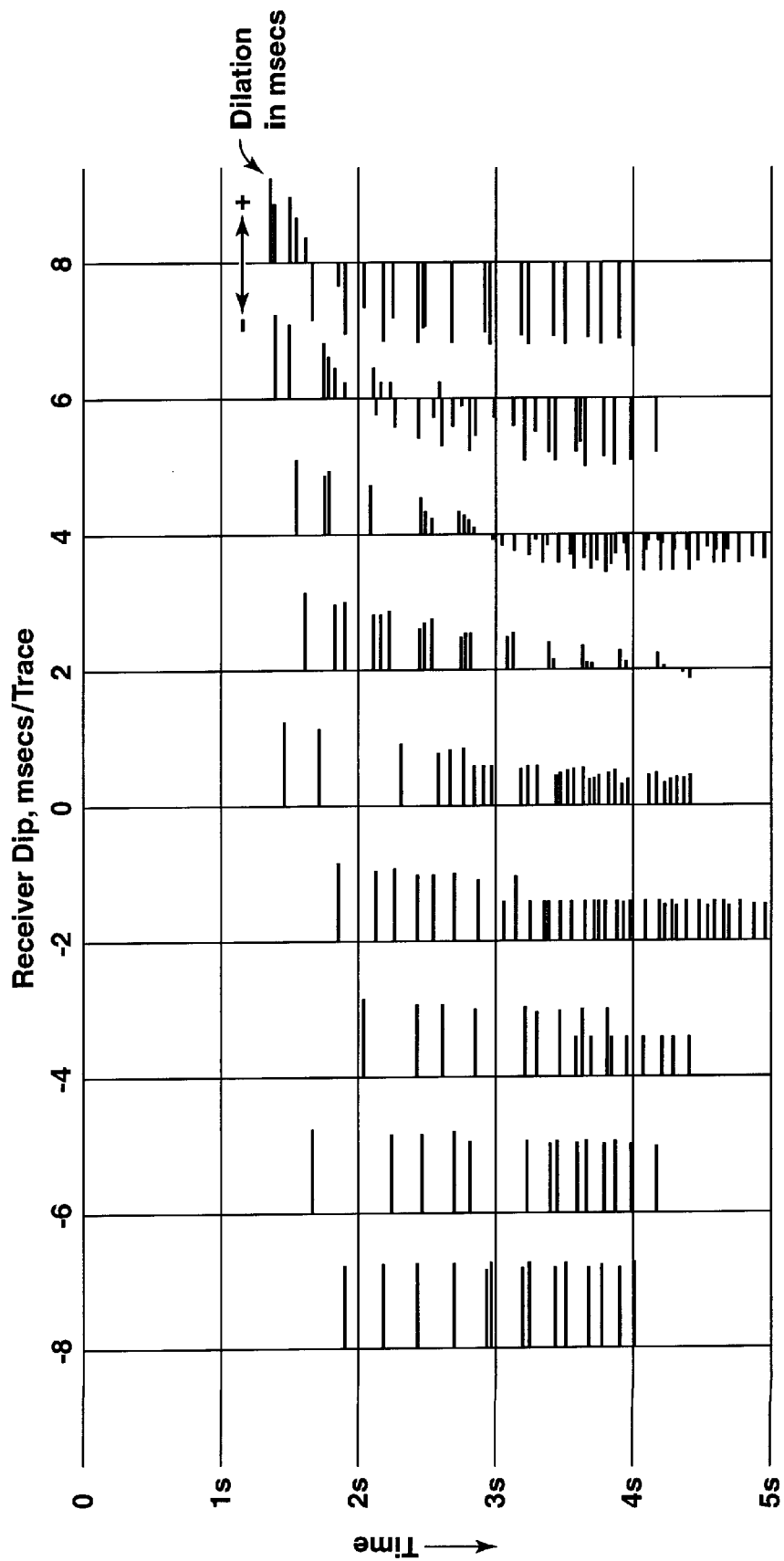
FIG. 8 shows the source-motion induced distortions predicted by the model of FIG. 7.
Figure 9:
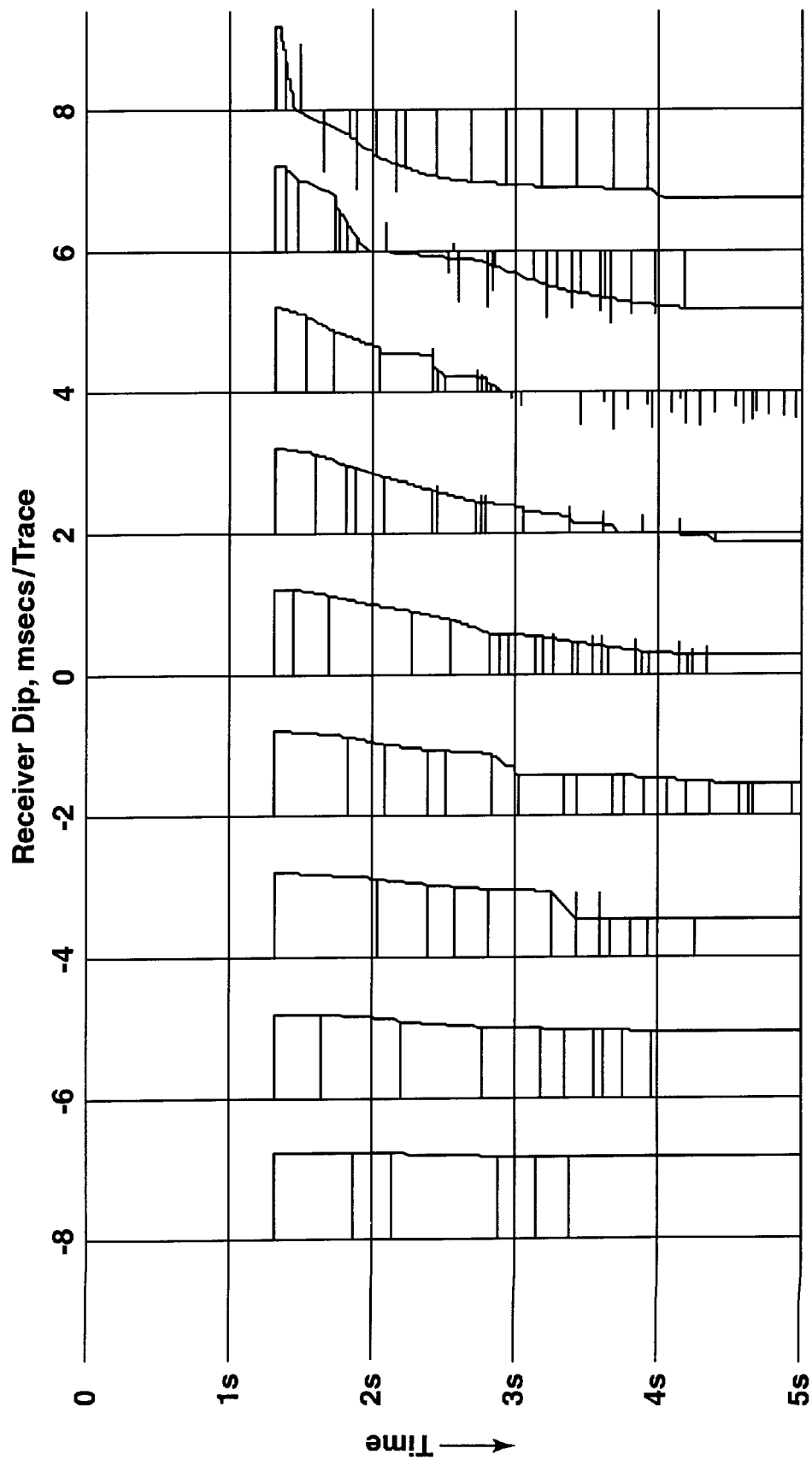
FIG. 9 shows a dilation function determined from the model of FIG. 7.

FIG. 8 shows signals received at various receiver dip angles from the diffractors. For each received signal path, the above-calculated dilation factor multiplied by the sweep length is plotted as a function of the travel time. As shown, positive dilation values are plotted to the right of each axis, and negative dilation values to the left of the axes. In step 174 (see FIG. 6), a smooth dilation function for each receiver dip angle is constructed from these points. One method is to perform linear interpolation to obtain a set of evenly spaced points, and then to perform a moving average to "smooth" the dilation function. An alternate, currently preferred, method is to eliminate larger dilation points as needed to make the dilation function monotonic, and then to perform linear interpolation. FIG. 9 shows an example of the application of this method. FIGS. 15A–15E show source code in BASIC for one method of calculating the dilation function from the output of the program shown in FIGS. 14A–14E. The correction functions for each receiver can then be combined with those of other receivers to form a set of correction functions for the receiver array as a whole.

Correcting Data for Source Motion (step 156)

Figure 10:
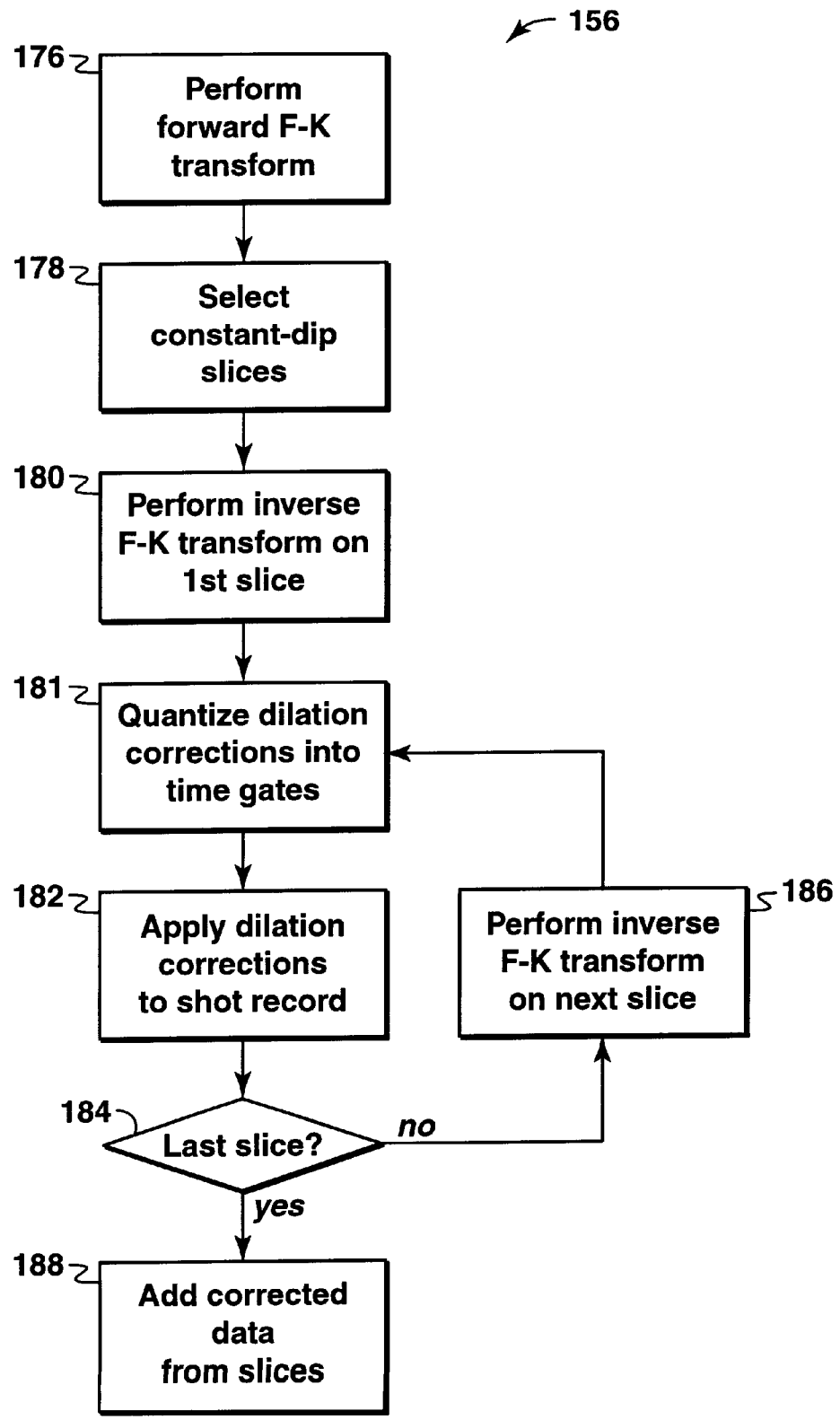
FIG. 10 shows a preferred method for applying the corrections for source motion effects to the received seismic data.

FIG. 10 shows a flowchart of a method which may be used to implement step 156 of FIG. 3. In step 176, an F-K transform (where F refers to temporal frequency and K refers to spatial frequency or wave number) is performed on the fixed-receiver data from step 152, or alternatively, to the correlated data from step 168. It is noted that other suitable transforms, such as the Laplace transform, radon transform and τ-p transform, can also be used. The F-K transform is a two-dimensional Fourier transform in which a signal that is a function of time, t, and space, x, is transformed to a signal that is a function of frequency, f, and wave number, k. The transformed signal can be plotted on a plot in the transform domain, such as that shown in FIG. 11. Converting a function from the time and space domain into the frequency and wave number domain is referred to as a forward F-K transform. By analogy, converting a function from the frequency and wave number domain back into the time and space domain is referred to as an inverse F-K transform. The forward F-K transform is represented mathematically with a double integral as:

$$P(k, f) = \int \int p(x,t) e^{-i2\pi(kx+ft)} dx dt \quad (8)$$

where $P(k,f)$ is the F-K transform of $p(x,t)$. The inverse F-K transform (performed in steps 180 and 186) is represented as:

$$p(x,t) = \int \int P(k,f) e^{+i2\pi(kx+ft)} dk df \quad (9)$$

Figure 11:
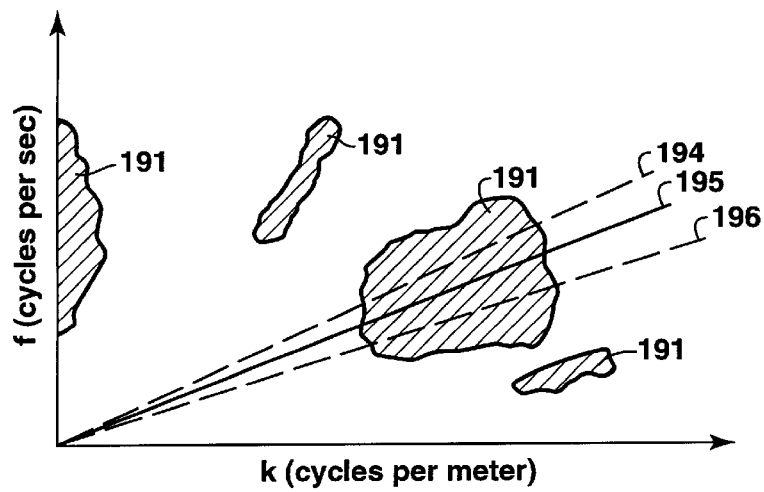
FIG. 11 shows an exemplary plot of seismic data in the F-K domain.

Referring again to FIG. 10, in step 178, the seismic measurement system selects a constant time dip slice of data (described below) from the F-K plot. This step is best understood with reference to FIGS. 11 and 12. FIG. 11 shows an F-K plot of a transformed shot record from FIG. 12. The frequency measured in cycles per second or "Hertz" (Hz) is represented on the vertical axis and the wave number measured in cycles per meter is represented on the horizontal axis. The seismic wave reflections in the F-K transformed data are represented by portions 191 in the F-K plot.

Figure 12:
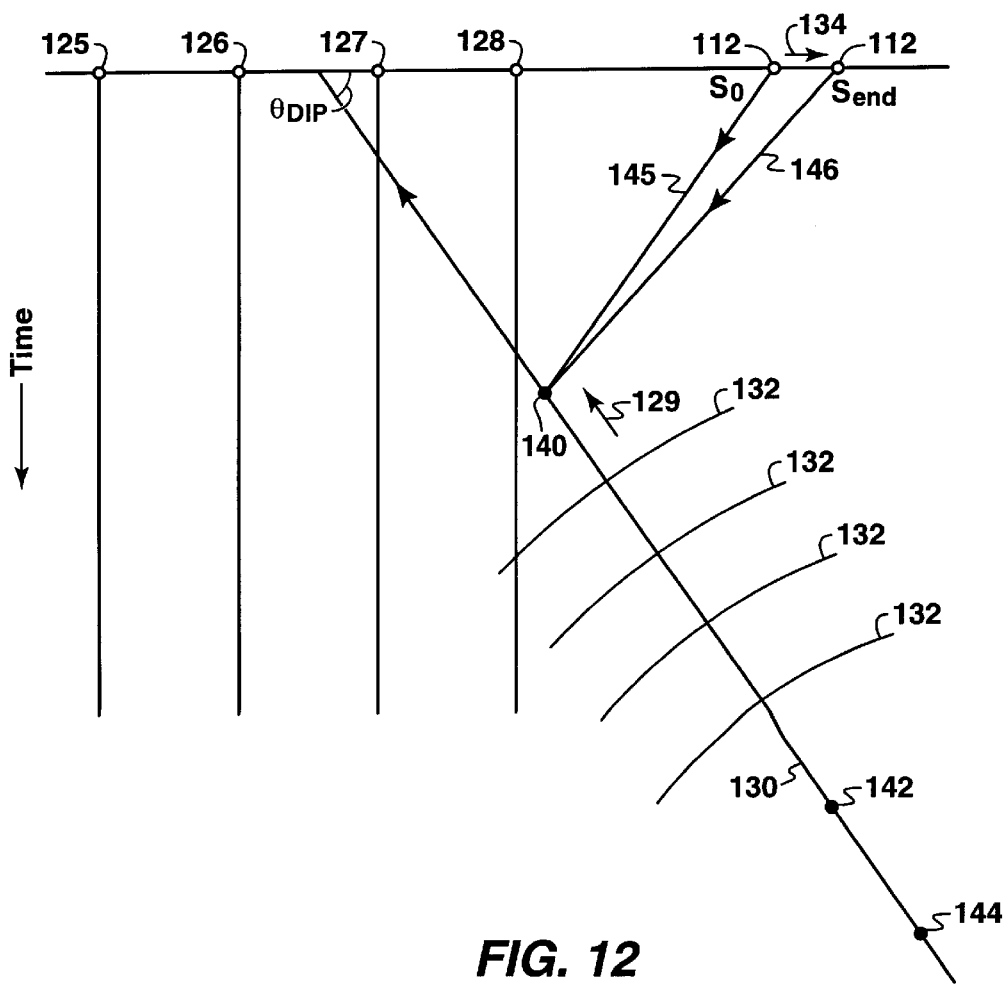
FIG. 12 shows exemplary shot records of multiple receivers in which only data at a constant dip angle is included in the shot records.

Every straight line, such as lines 194, 195, 196, beginning from the origin of the F-K axes and extending outward represents seismic data with a particular apparent velocity. Further, the slope of each such straight line is equal to an apparent velocity. Referring to FIG. 12, receivers 125, 126, 127, 128 are shown with a seismic wave 132 propagating through the earth (including water) in the direction of arrow 129. Line 130 represents the direction of propagation of seismic wave 132 and forms an angle with the source's direction of motion 134. That angle is referred to as the angle of approach, apparent dip angle, or simply dip angle and is denoted in FIGS. 12 and 13 as $\theta_{DIP}$ Line 130 thus is referred to as the dip line or line of approach for purposes of this application.

Figure 13:
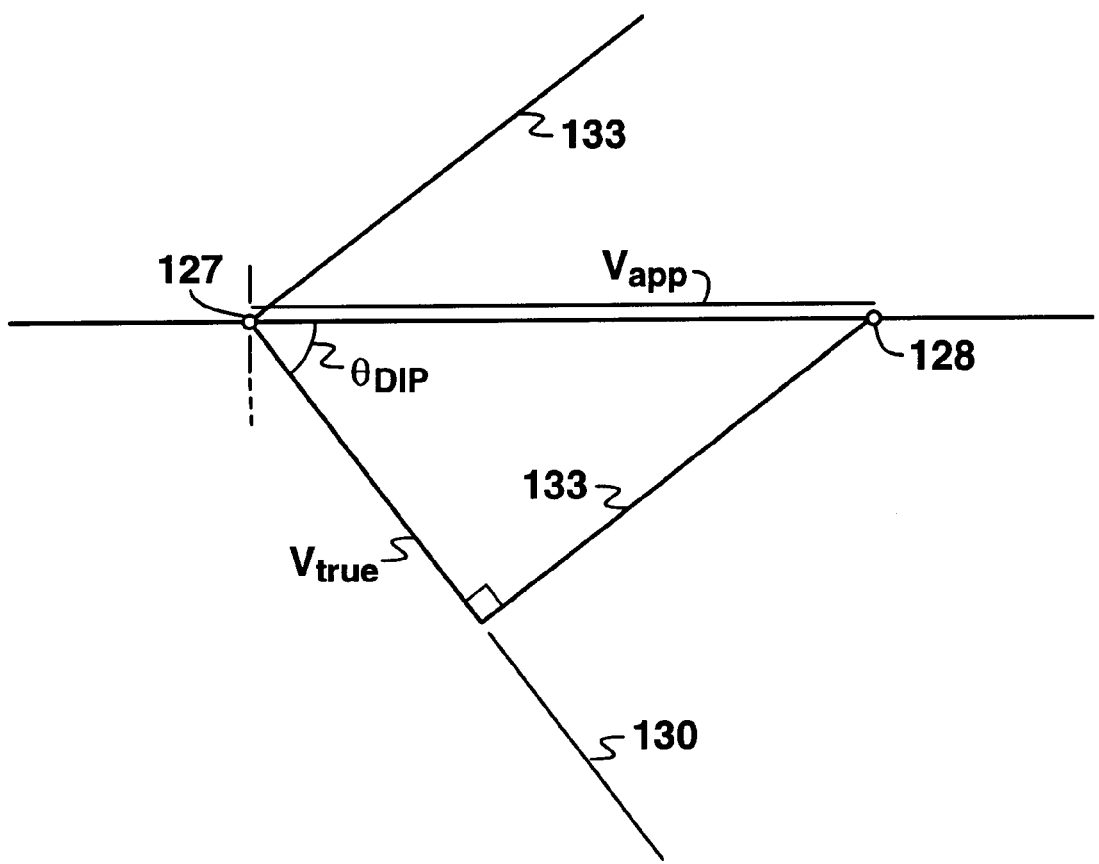
FIG. 13 shows the relationship between apparent wave velocity and true wave velocity.

Referring to FIG. 13, straight line 133 is perpendicular to dip line 130 and represents schematically the wavefront of waves 132 as they travel upward at the dip angle $\theta_{DIP}$. The wavefront 133 propagates up through the earth with a certain velocity referred to as the true velocity, $V_{true}$. The true velocity of seismic waves propagating through water is approximately 1500 meters per second (3325 miles per hour), and in general is considered to be a constant. True velocities can be easily determined using any one of a variety of known techniques.

Referring to FIG. 13, the horizontal component of the true velocity vector is referred to as the apparent velocity, $V_{app}$. The apparent velocity, $V_{app}$, is:

$$\text{Vapp} = \text{Vtrue}/\cos(\theta_{DIP}). \tag{10}$$

Where "cos" is the trigonometric cosine function. The apparent velocity has physical significance in that it is the horizontal velocity of the seismic wave 132 as detected by the receivers. As wavefront 133 moves upward, receiver 128 will detect the wavefront before receiver 127 detects it. Further, because of the distance between receivers 127 and 128 and the time interval between when the wavefront is detected by receiver 128 then receiver 127, the wavefront will appear to be traveling horizontally with velocity $V_{app}$.

As can be seen by equation (10), $V_{app}$ is inversely proportional to the cosine of the dip angle $\theta_{DIP}$, given that $V_{true}$ is a constant. Thus, each straight line in the F-K plot of FIG. 11, the slope of which is $V_{app}$, defines a dip angle, $\theta_{DIP}$ in FIG. 12 and 13. Moreover, data in the F-K plot of FIG. 11 along a straight line, such as line 195, represents only the seismic energy that propagated up through the earth at a particular dip angle, and excludes seismic energy propagating upwards at all other dip angles.

Referring now to FIGS. 10, 11, and 12, the seismic measurement and processing system 51 preferably corrects the data for source motion by selecting a constant time dip slice of data from the F-K domain in step 178 (FIG. 10). An exemplary constant time dip slice is shown in FIG. 11 as the portion of data 191 bounded by straight lines 194 and 196. Because lines 194 and 196 define a pie-shaped wedge in the F-K plot, the data contained between lines 194, 196 is referred to as a constant time dip slice or pie slice. By selecting a pie slice of F-K data and inverse F-K transforming the selected pie slice data in step 180, the seismic measurement and processing system 51 selects only the seismic energy that propagates upward through the earth within a range of dip angles defined by the slopes of lines 194 and 196. Thus, according to the preferred embodiment of the invention, a constant time dip slice of F-K data is selected in step 178 and inverse F-K transformed in step 180. The size of the pie slice can be set to whatever size is desired and is generally a function of the accuracy desired. The size of the pie slice thus relates to a range of dip angles, $\theta_{DIP} \pm \Delta\theta_{DIP}$.

The result of step 180 is a shot record that has been corrected for receiver motion and that represents the seismic energy that corresponding to a range of dip angles $\theta_{DIP} \pm \Delta\theta_{DIP}$ that are related as described above to the apparent velocity defined by the pie slice. It should be recognized that the seismic energy at dip angle $\theta_{DIP}$ includes a superposition of seismic waves that have reflected off diffractors illuminated by the chosen range of dip angles. Using principles grounded in classical Doppler theory, the data can be corrected for source motion.

To understand the application of Doppler theory, reference is made to FIG. 12 in which a source 112 moves from location $s_0$ at the beginning of the MVS frequency sweep to location $s_{end}$ at the end of the frequency sweep. Point diffractors 140, 142, 144 represent exemplary diffractor locations along line 130. Lines 145 and 146 represent the direction seismic waves travel from the initial source location $s_0$ and the ending source location $s_{end}$, respectively, to point diffractor 140. Similar lines can be drawn for seismic waves traveling to diffractors 142, 144. The seismic waves reflected by diffractors 140, 142, 144 travel upward along line 130 with dip angle $\theta_{DIP}$.

As shown, the source 112 moves from left to right and thus moves away from diffractor 140. Because the source moves away from the diffractor, the period of the emitted frequency sweep source signal will appear longer. Alternatively, the length of the frequency sweep will appear to be longer from the vantage point of diffractor 140. This change in frequency and length of the frequency sweep is referred to as frequency shift under Doppler theory. In this example, however, the source approaches diffractor 144 during the frequency sweep, and thus the frequency sweep becomes shorter from the vantage point of diffractor 144. Diffractor 142 is below the midpoint of the source's trajectory as it moves during the frequency sweep, and thus there is zero net frequency shift associated with diffractor 142. Moreover, the distortion due to source motion can be represented by the magnitude of the frequency shift using Doppler theory. The magnitude of the Doppler shift can be computed for each diffractor location, or range of diffractor locations, and appropriate filters can be designed to correct the data for the distortion. The change in length in the frequency sweep, measured in units of milliseconds, is referred to as dilation (or compression).

The previously calculated dilation function (see FIG. 9) for the chosen dip angle varies with time, and consequently in step 181 may be divided into time gates so that the seismic measurement and processing system 51 can provide a correction filter for each time gate. In step 182 the seismic measurement and processing system 51 applies the correction filters to the shot record to correct for the dilation.

Although correction filters can be calculated on a sample-by-sample basis (which may be preferred), satisfactory results can be achieved in less time if in step 181 the dilation curve is divided into segments and correction filters are determined for each segment as a whole rather than for each individual sample. Thus, according to the preferred embodiment, dilation values are fixed for each segment (referred to hereafter as a time gate), and the segments are chosen so that the modeled dilation value diverges from the fixed value by no more than 5%, for example. Other criteria for quantizing the dilation values and selecting the time gates are also contemplated. The quantization resolution and the time gates can be set to any size.

Numerous techniques are available to construct appropriate filters to compensate the shot records for the amount of dilation in each time gate. For example, a filter can be constructed by taking the source sweep signal and resampling it to a sampling period of $\Delta t'$ where $$\Delta t' = \frac{T_{SL}}{T_{SL} + DIL} \Delta t \qquad (11)$$

and where $T_{SL}$ is the duration of the sweep signal, DIL is the quantized dilation, and $\Delta t$ is the sampling period for the shot record. After resampling, the new sample rate is overruled and called $\Delta t$ providing a new sampled sweep signal with the desired dilation applied. As an exaggerated example, for a 1 second sweep dilated by 1 second and sampled at a 2 millisecond period (one sample taken every 2 milliseconds), the sweep is resampled to 1 millisecond providing twice as many samples. The resampled data's sampling period is then relabeled as a sample period of 2 milliseconds making the record twice as long. The dilated sweep can then be applied as a filter to the constant-dip shot record (for previously uncorrelated seismic data).

Alternatively, the dilated sweep can be correlated with the non-dilated sweep, and the phase of the result used as the required phase correction for previously correlated seismic data. This would be appropriate if the correlated data from step 168 were used as the input data for the forward F-K transform of step 176. The phase correction may be applied using a standard all pass inverse filter, such as can be obtained using the Wiener-Levinson technique. An all pass inverse filter does not alter the amplitude content of the data, rather only the phase content. The filter preferably is constructed to apply the desired phase correction, thereby eliminating the Doppler-induced phase distortion.

The correction filters preferably are applied to the entire trace of data and then the appropriate time-gate segments from each corrected trace are selected and combined together to form a completely corrected data set. Thus, the correction for the data for a 0-to-1 second time gate, for example, is applied to the data. Similarly, the corrections for 1-to-2 second, 2-to-3 second, and 3-to-4 second, time gates are also applied to the data set, thereby generating four data sets each corrected by a particular correction filter. Then, only the corrected data from 0 to 1 seconds is selected from the first data set, the corrected data from 1 to 2 seconds is selected from the second data set, the corrected data from 2 to 3 seconds is selected from the third data set, the corrected data from 3 to 4 seconds is selected from the fourth data set, and so on.

After correcting the seismic data for receiver and source motion for a constant dip slice in step 182, the next dip slice of F-K data is selected in step 186 and steps 181–186 are repeated until all dip slices of the F-K data has been selected, inverse transformed, and corrected. Once all the data has been corrected for each dip slice of F-K data, the results are summed in step 188 to produce the desired data corrected for source and receiver motion.

Numerous variations and modifications will become apparent to those skilled in the art once the above disclosure is fully appreciated. It is intended that the following claims be interpreted to embrace all such variations and modifications.

We claim:

1. A method for correcting seismic data for distortion caused by the motion of a seismic source and the motion of a seismic receiver, comprising:

(a) correcting the seismic data for motion of the receiver to obtain fixed-receiver seismic data;

(b) correlating the fixed-receiver seismic data with a frequency sweep signal to obtain correlated seismic data;

(c) determining a seismic-velocity model from the correlated seismic data; and (d) computing a dilation function for a chosen dip slice from the seismic velocity model.

2. The method of claim 1, wherein step (c) includes:

calculating root-mean-square velocities for reflected seismic waves;

converting the root-mean-square velocities into interval velocities; and determining interval depths through which the reflected seismic waves traveled at corresponding interval velocities.

3. The method of claim 2, wherein step (d) includes:

determining a dilation and a travel time of seismic waves reflected from the seismic source to the seismic receiver for each diffractor in an array of diffractors assumed to be present in the seismic-velocity model;

segregating the diffractors into sets sharing a common receiver dip slice; and determining a dilation versus time function from the dilation and travel times of diffractors in a selected set.

4. The method of claim 1, further comprising:

(e) computing a forward F-K transform of the correlated seismic data to produce F-K transformed data;

(f) selecting a constant dip slice of said F-K transformed data;

(g) computing an inverse F-K transform of said selected dip slice of said F-K transformed data to produce correlated seismic data for the selected dip slice; and (h) correcting the correlated seismic data for the selected dip slice to substantially eliminate dilation as indicated by the computed dilation function from step (d).

5. The method of claim 4, wherein step (h) includes:

dilating a frequency sweep signal by an amount indicated from the dilation function to obtain a dilated frequency sweep signal;

correlating the frequency sweep signal with the dilated frequency sweep signal to determine a phase error;

applying a phase correction filter to the correlated seismic data to substantially eliminate the phase error.

6. The method of claim 4, further comprising:

(i) repeating steps (f), (g), and (h) to obtain dilation-compensated seismic data for a plurality of constant dip slices; and (j) combining the dilation-compensated seismic data for the dip slices to obtain seismic data which has been corrected for source and receiver motion.

7. The method of claim 1, further comprising:

(e) computing a forward F-K transform of the fixed-receiver seismic data to produce F-K transformed data;

(f) selecting a constant dip slice of said F-K transformed data;

(g) computing an inverse F-K transform of said constant dip slice of said F-K transformed data to produce fixed-receiver seismic data for the chosen dip slice; and (h) correcting the fixed-receiver seismic data for the chosen dip slice to substantially eliminate dilation as indicated by the computed dilation function from step (d).

8. The method of claim 7, wherein step (h) includes:

dilating a frequency sweep signal by an amount indicated from the dilation function to obtain a dilated frequency signal; and correlating the fixed-receiver seismic data with the dilated frequency sweep signal to produce dilation-compensated correlated seismic data.

9. The method of claim 7, further comprising:

(i) repeating steps (f), (g), and (h) to obtain dilation-compensated seismic data for a plurality of constant dip slices; and (j) combining the dilation-compensated seismic data for the dip slices to obtain seismic data which has been corrected for source and receiver motion.

10. The method of claim 7 wherein said step of selecting a constant dip slice of said F-K transformed data includes selecting F-K transformed data corresponding to a predetermined range of dip angles.

11. A seismic measurement system, comprising:

a user input device;

a display device;

a data storage unit;

a processing unit coupled to the user input device, the display device, and the data storage unit, wherein the processing unit is configured to create a seismic velocity model from measured seismic data, and is configured to use the seismic velocity model to calculate a dilation function indicative of distortion caused by motion of a seismic source.

12. The seismic measurement system of claim 11, wherein said processing unit is further configured to correct the measured seismic data for the distortion caused by motion of the seismic source by computing an F-K transform of the measured seismic data, partitioning the transformed seismic data into dip slices, inverse transforming the individual dip slices, correcting the inverse transformed dip slice data, and adding together corresponding time values of the corrected dip slice data.

13. The seismic measurement system of claim 12, wherein the processing unit corrects the inverse transformed dip slice data by applying a series of filters, wherein the filters are determined by dilating a frequency sweep signal as indicated by the dilation function.

14. The seismic measurement system of claim 13, wherein the dilation function is divided into time segments and a filter is determined for each time segment and applied to a corresponding time segment of the inverse-transformed dip slice data.

15. A seismic system, comprising:

at least one seismic source configured to transmit a frequency sweep signal;

at least one seismic receiver configured to provide measured seismic signals; and a seismic measurement and processing system which includes:

a user input device;

a display device;

a data storage unit;

a source and receiver interface unit coupled to said seismic source and seismic receiver;

a processing unit coupled to the user input device, the display device, and the data storage unit, wherein the processing unit is configured to create a seismic velocity model from measured seismic data, and is configured to use the seismic velocity model to calculate a dilation function indicative of distortion caused by motion of a seismic source.

16. The seismic measurement system of claim 15, wherein said processing unit is further configured to correct the measured seismic data for the distortion caused by motion of the seismic source by computing an F-K transform of the measured seismic data, partitioning the transformed seismic data into dip slices, inverse transforming the individual dip slices, correcting the inverse transformed dip slice data, and adding together corresponding time values of the corrected dip slice data.

17. The seismic measurement system of claim 16, wherein the processing unit corrects the inverse transformed dip slice data by applying a series of filters, wherein the filters are determined by dilating a frequency sweep signal as indicated by the dilation function.

18. The seismic measurement system of claim 17, wherein the dilation function is divided into time segments and a filter is determined for each time segment and applied to a corresponding time segment of the inverse-transformed dip slice data.

* * * * *